(12) United States Patent
Mays et al.

(10) Patent No.: US 10,160,028 B2
(45) Date of Patent: Dec. 25, 2018

(54) EXPANDING FLEXIBLE BLADDER TO INSERT TOOL

(71) Applicant: Bell Helicopter Textron Inc., Fort Worth, TX (US)

(72) Inventors: Mark Mays, Fort Worth, TX (US); Brian S. Modrzejewski, Keller, TX (US); Dan Brungs, Mansfield, TX (US); Doug Wylin, Trophy Club, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 956 days.

(21) Appl. No.: 14/612,824

(22) Filed: Feb. 3, 2015

(65) Prior Publication Data

US 2016/0221062 A1 Aug. 4, 2016

(51) Int. Cl.
| | | |
|---|---|---|
| B21D 39/20 | (2006.01) | |
| B29C 70/44 | (2006.01) | |
| B29C 33/38 | (2006.01) | |
| B29C 45/14 | (2006.01) | |
| B29C 43/36 | (2006.01) | |

(52) U.S. Cl.
CPC ........ *B21D 39/203* (2013.01); *B29C 33/3821* (2013.01); *B29C 43/3642* (2013.01); *B29C 45/14467* (2013.01); *B29C 70/44* (2013.01); *B29C 70/443* (2013.01)

(58) Field of Classification Search
CPC ... B21D 39/203; B29C 70/44; B29C 33/3821; B29C 70/443; B29C 45/14467; B29C 43/3642
USPC .......................................................... 72/62
See application file for complete search history.

(56) References Cited

U.S. PATENT DOCUMENTS

| | | | | |
|---|---|---|---|---|
| 5,454,693 | A * | 10/1995 | Aubry ............... | B29C 45/14467 264/250 |
| 6,712,238 | B1 * | 3/2004 | Mills ....................... | E04F 21/08 222/399 |
| 9,669,589 | B2 * | 6/2017 | Zamora Rodriguez ..................... | B29C 70/443 |
| 2007/0080481 | A1 * | 4/2007 | Kismarton .......... | B29C 43/3642 264/236 |
| 2009/0309268 | A1 * | 12/2009 | Cavaliere ............ | B29C 33/3821 264/511 |
| 2011/0221093 | A1 * | 9/2011 | Perrow .................. | B29C 70/44 264/255 |
| 2016/0221062 | A1 * | 8/2016 | Mays ................... | B21D 39/203 |

\* cited by examiner

*Primary Examiner* — David B Jones

(57) ABSTRACT

A flexible bladder can be expanded to insert a tool by implementing a tool assembly that includes an elongated hollow member including a hollow portion to receive at least one of a flexible bladder or a tool. An inlet member is attached to an end of the elongated hollow member. The inlet member receives at least one of the flexible bladder or the tool. A port is positioned on the elongated hollow member to apply vacuum inside the elongated hollow member.

18 Claims, 5 Drawing Sheets

EXPANDING FLEXIBLE BLADDER TO INSERT TOOL

TECHNICAL FIELD

This disclosure relates to manufacturing components, e.g., rotorcraft components.

BACKGROUND

Certain components, e.g., rotorcraft components or components of other mechanical systems, can be manufactured using composite materials. In certain composite manufacturing processes, a flexible bladder can be positioned around a component, e.g., a tool or other component, such that the component serves as a form tool for the component to be manufactured. For example, in rotorcraft manufacturing, a blade spar process can use a rubber bladder that has a foam mandrel inserted within. The spar composite material can then be positioned on the bladder/mandrel tool. During a cure cycle, the bladder can expand to push material in the final configuration of the designed component. One method to position the component inside the flexible bladder is to expand the bladder over the component. However, such a method can not only be labor intensive but can also risk tearing the bladder.

SUMMARY

This disclosure describes technologies relating to manufacturing components, e.g., rotorcraft components. This disclosure also describes technologies relating to positioning a component within a flexible bladder.

Some aspects can be implemented as a tool assembly that includes an elongated hollow member including a hollow portion to receive at least one of a flexible bladder or a tool. An inlet member is attached to an end of the elongated hollow member. The inlet member receives at least one of the flexible bladder or the tool. A port is positioned on the elongated hollow member to apply vacuum inside the elongated hollow member.

This, and other aspects, can include one or more of the following features. The elongated hollow member can include an inner surface that is substantially identical to an outer surface of the tool. The tool can include a contoured outer surface. The elongated hollow member can include a contoured inner surface at a location that substantially corresponds to a location of the contoured outer surface of the tool. The inlet member can include a lip to wrap the flexible bladder around. The port can be a first port. The tool assembly can include a second port on the elongated hollow member. The second port can connect to a pressure gauge or can relieve vacuum in the elongated hollow member. The tool assembly can include multiple ports to apply vacuum inside the elongated hollow member. The elongated hollow member can include multiple outer surfaces. A first port of the multiple ports can be on a first outer surface. A second port of the multiple ports can be on a second outer surface that is different from the first outer surface. The first outer surface can be opposite the second outer surface. The tool assembly can include an outer housing including multiple chambers including a first chamber to receive the elongated hollow member. Each chamber can include a respective inlet member and a respective port. The first chamber can include a port to apply vacuum inside the first chamber. The elongated hollow member can include multiple perforations to transfer the vacuum to the elongated hollow member.

Some aspects can be implemented as a method. A flexible bladder is positioned within a hollow portion of an elongated hollow member including a port. Vacuum is applied to the port. The vacuum expands the flexible bladder within the hollow portion. A tool is inserted into the expanded flexible bladder.

This, and other aspects, can include one or more of the following features. The elongated hollow member can include an upper portion and a lower portion that together define the hollow portion. Positioning the flexible bladder within the hollow portion can include laying the flexible bladder within the lower portion and positioning the upper portion over the lower portion. The elongated hollow member can include an inlet member at an end of the elongated hollow member. Positioning the flexible bladder within the hollow portion can include inserting the flexible bladder into the hollow portion through the inlet member. The inlet member can include a lip. The flexible bladder can be wrapped around the lip. The elongated hollow member can include an inner surface that is substantially identical to an outer surface of the tool. The tool can include a contoured outer surface. The elongated hollow member can include a contoured inner surface at a location that substantially corresponds to a location of the contoured outer surface of the tool.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes expanding a flexible bladder to insert a tool, e.g., a mandrel or other tool. One technique to install a tool inside a flexible bladder is to pull the bladder over the tool. For manufacturing composite blade spars of a rotorcraft, several people may need to work together to pull the bladder over the mandrel. The bladder may also be damaged. This disclosure describes a tool assembly within which the bladder can be placed and expanded using vacuum. The tool can then be inserted into the expanded bladder. Implementations of the technology described here can improve the process of positioning a component inside a flexible bladder by reducing a risk of tearing or weakening the bladder, e.g., by reducing stresses and/or strains on the bladder material, decreasing labor time, decreasing risk of injuries to operators, and making the positioning process significantly easier compared to the technique described above.

Figure 1A:
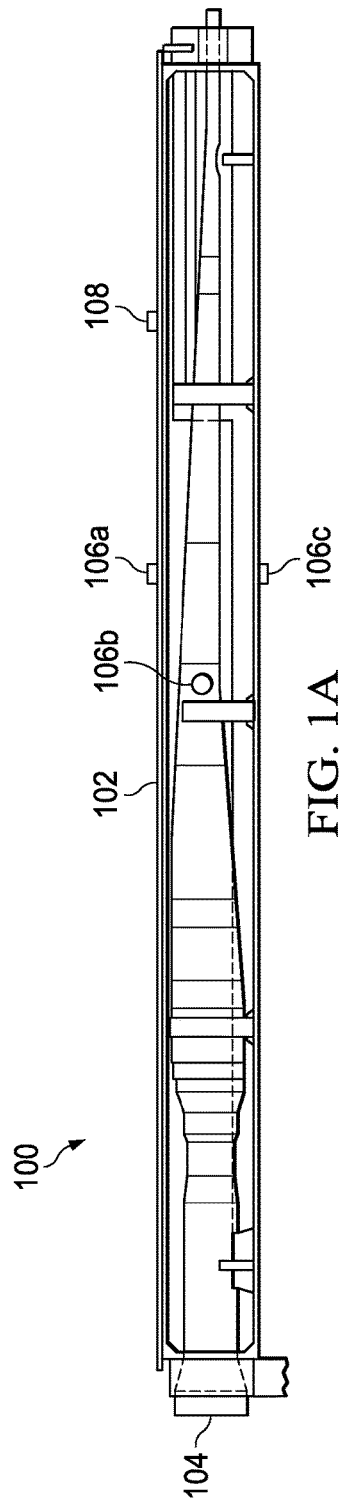
FIG. 1A is a side cross-sectional view of an example tool assembly for positioning a tool within a flexible bladder.
Figure 1C:
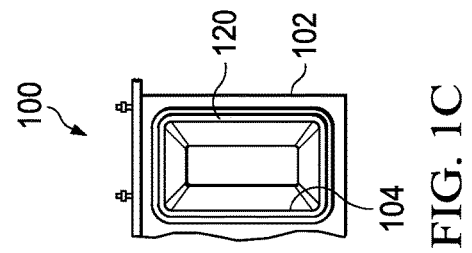
FIG. 1C is an end view of the example tool assembly.
Figure 1B:
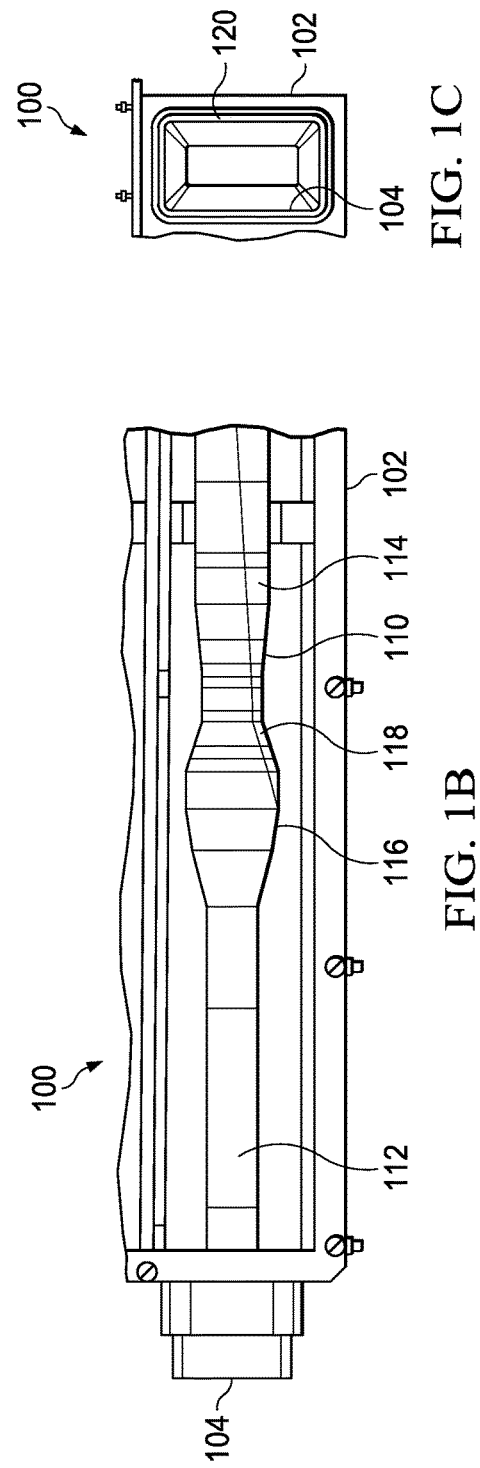
FIG. 1B is a side cross-sectional view of a portion of the example tool assembly.

FIG. 1A is a side cross-sectional view of an example tool assembly 100 for positioning a tool within a flexible bladder. FIG. 1B is a side cross-sectional view of a portion of the example tool assembly 100. FIG. 1C is an end view of the example tool assembly 100. The tool assembly 100 includes an elongated hollow member 102 including a hollow portion to receive a flexible bladder or a tool (not shown). The tool can be a foam tool or tool made from some other material such as aluminum or steel. The shape of the tool depends on a shape of the component to be manufactured. The tool assembly 100 includes an inlet member 104 attached to an end of the elongated hollow member 102. The inlet member 104 can receive the flexible bladder or the tool. The tool assembly 100 includes one or more ports (e.g., a first port 106a, a second port 106b, a third port 106c, and/or other ports) on the elongated hollow member 102 to apply vacuum inside the elongated hollow member 102.

The tool (not shown) can be a mandrel or other generally elongated component to be inserted into a flexible bladder 112. The elongated hollow member 102 can include an inner surface 110 that is substantially identical to an outer surface of the tool. For example, as shown in FIG. 1B, the tool can include a contoured surface at a location. The elongated hollow member 102 can include a contoured inner surface 118 at the location of the contoured outer surface of the tool. Such a construction of the inner surface of the elongated hollow member 102 can enable the member 102 to accommodate tools having contoured surfaces. In addition, the tool to be inserted into the flexible bladder 112 need not be straight and uniform, but can be bent (for example, have a kink) and have portions of differing diameters, as shown in FIG. 1B.

The inlet member 104 can be a separate member that is attached to an end of the elongated hollow member 102. Alternatively, the end of the elongated hollow member 102 can be formed into the inlet member 104 such that the elongated hollow member 102 is a unitary body. As shown in FIG. 1C, the inlet member 104 can include a lip 120 to wrap the flexible bladder 112 around.

In implementations in which the evacuated space (i.e., an inner volume of the elongated hollow member) is small, a quantity of vacuum can be applied to a single port to expand the bladder and the remaining ports can be sealed. In implementations in which the evacuated space is relatively larger, a relatively larger quantity of vacuum can be applied in one or more ports. A quantity of vacuum needed to expand the flexible bladder can depend upon a volume of space being evacuated. For example, the same quantity of vacuum can be applied either in multiple small ports or one large port based on a volume of the space to be evacuated.

In some implementations, the elongated hollow member 102 can include one or more additional ports (e.g., port 108) to connect to a pressure gauge and/or to relieve vacuum in the elongated hollow member. For example, vacuum can be applied through the first port 106a and the second port 106b. A pressure gauge can be connected to port 108. The third port 106c can initially be closed. When the pressure gauge indicates that a specified vacuum has been reached within the tool assembly 100, the third port 106c can be opened to relieve the vacuum. In some implementations, all the ports can have a similar construction such that a port can be used to either connect to a vacuum pump, connect to a pressure gauge or relieve vacuum.

In some implementations, the elongated hollow member 102 can include multiple outer surfaces. For example, the elongated hollow member 102 can have a substantially rectangular cross-section. A first port can be formed on a first outer surface, a second port can be formed on a second outer surface which, for example, is perpendicular to or parallel and opposite to the first surface, and so on. In general, a cross-section of the elongated hollow member 102 can depend upon a shape of a tool to be positioned within the flexible bladder 112. For example, the elongated hollow member 102 can have a triangular, square, polygonal, circular or oval cross-section. In general, the cross-section of the elongated hollow member 102 can depend on the structure of the component being fabricated, e.g., blades, hollow panels, tubes or other components. In some implementations, an outer surface of the elongated hollow member 102 can be substantially identical to the outer surface of the tool, and the ports (e.g., vacuum ports, pressure gauge ports, relief ports, or other ports) can be formed on the outer surface of the elongated hollow member 102.

In operation, an operator places a flexible bladder within the elongated hollow member 102 of the tool assembly 100. In some implementations, a top surface of the elongated hollow member 102 may be removable allowing the operator to lay the flexible bladder 112 flat within the elongated hollow member 102. The operator can then replace and clamp the top surface to the rest of the elongated hollow member 102.

Figure 2:
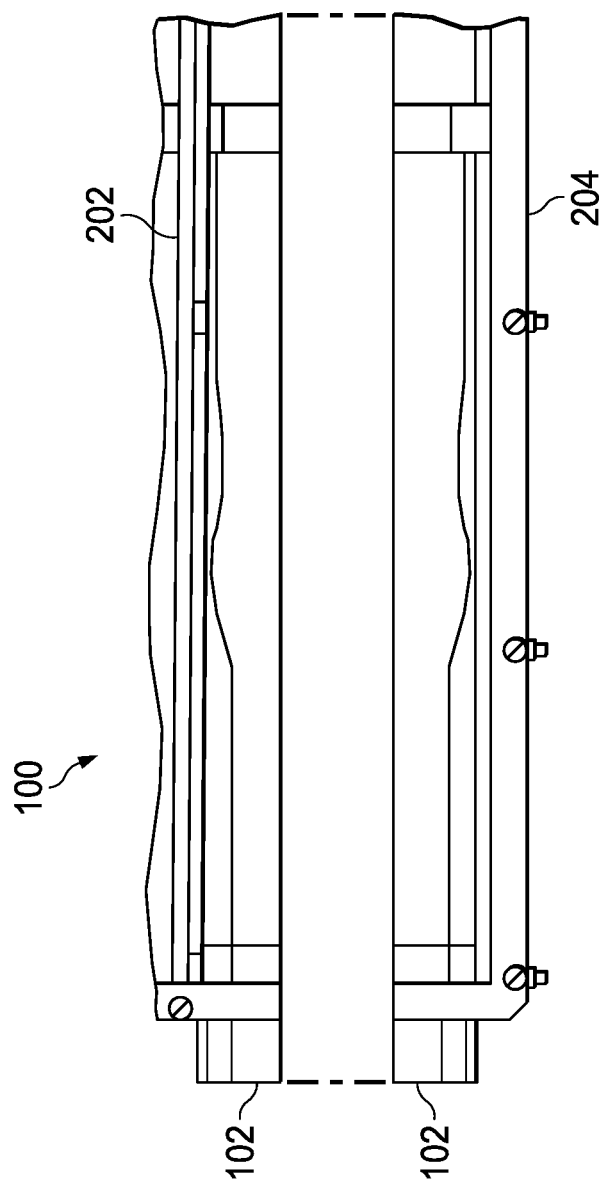
FIG. 2 is a side cross-sectional view of an upper portion and a lower portion of the example tool assembly.

In some implementations, the elongated hollow member can include an upper portion 202 and a lower portion 204 that together define the elongated hollow member 102. FIG. 2 is a side cross-sectional view of an upper portion 202 and a lower portion 204. To position the flexible bladder 112 into the elongated hollow member 102, the operator can remove the upper portion 202, lay the flexible bladder 112 flat in the lower portion 204, and replace and clamp the upper portion 202 on the lower portion 204.

In some implementations, the operator can insert the flexible bladder 112 into the end opening in the inlet member 104 to position the flexible bladder 112 in the elongated hollow member 102. After inserting the flexible bladder 112 in the elongated hollow member 102, the operator can wrap an end of the flexible bladder 112 around the lip 120.

The operator can connect a vacuum pump to one or more of the ports (e.g., the first port 106a, the second port 106b, the third port 106c or to more or fewer ports). In some implementations, the operator may connect a pressure gauge to the port 108. Alternatively, the operator may connect the vacuum pump to the port 108 or simply seal the port 108 and any other unused ports.

Having created an air tight enclosure between an outer surface of the flexible bladder 112 and an inner surface of the elongated hollow member 102, the operator can turn on the vacuum pump causing the space within the elongated hollow member 102 to be evacuated. The flexible bladder 112 can be drawn towards the inner surface of the elongated hollow member 102. As shown in FIG. 1B, for example, an outer surface 116 of the flexible bladder 112 at a location can match a contour of the inner surface 118 of the elongated hollow member 102 at a corresponding location. In this manner, the flexible bladder 112 expands into a shape of the inner surface of the elongated hollow member 102, which, in turn, matches an outer shape of the tool to be positioned within the flexible bladder 112. The operator can then insert the tool into the flexible bladder 112.

The vacuum applied to the flexible bladder 112 can cause the bladder to expand and additionally to stretch. In other words, an amount of vacuum applied to the flexible bladder 112 is sufficient to cause the flexible material to expand beyond its dimensions in an unexpanded state. Such expanding allows the flexible bladder 112 to fit snugly around the tool. Thus, a quantity of vacuum applied is sufficient to expand the material using which the flexible bladder 112 is made.

After positioning the tool within the flexible bladder 112, the operator can turn off the vacuum pump and relieve vacuum in the elongated hollow member 102. The elastic nature of the flexible bladder 112 can cause the flexible bladder 112 to shrink around the outer surface of the tool. The operator can then remove the tool with the flexible bladder 112 wrapped around from the tool assembly 100.

Figure 3A:
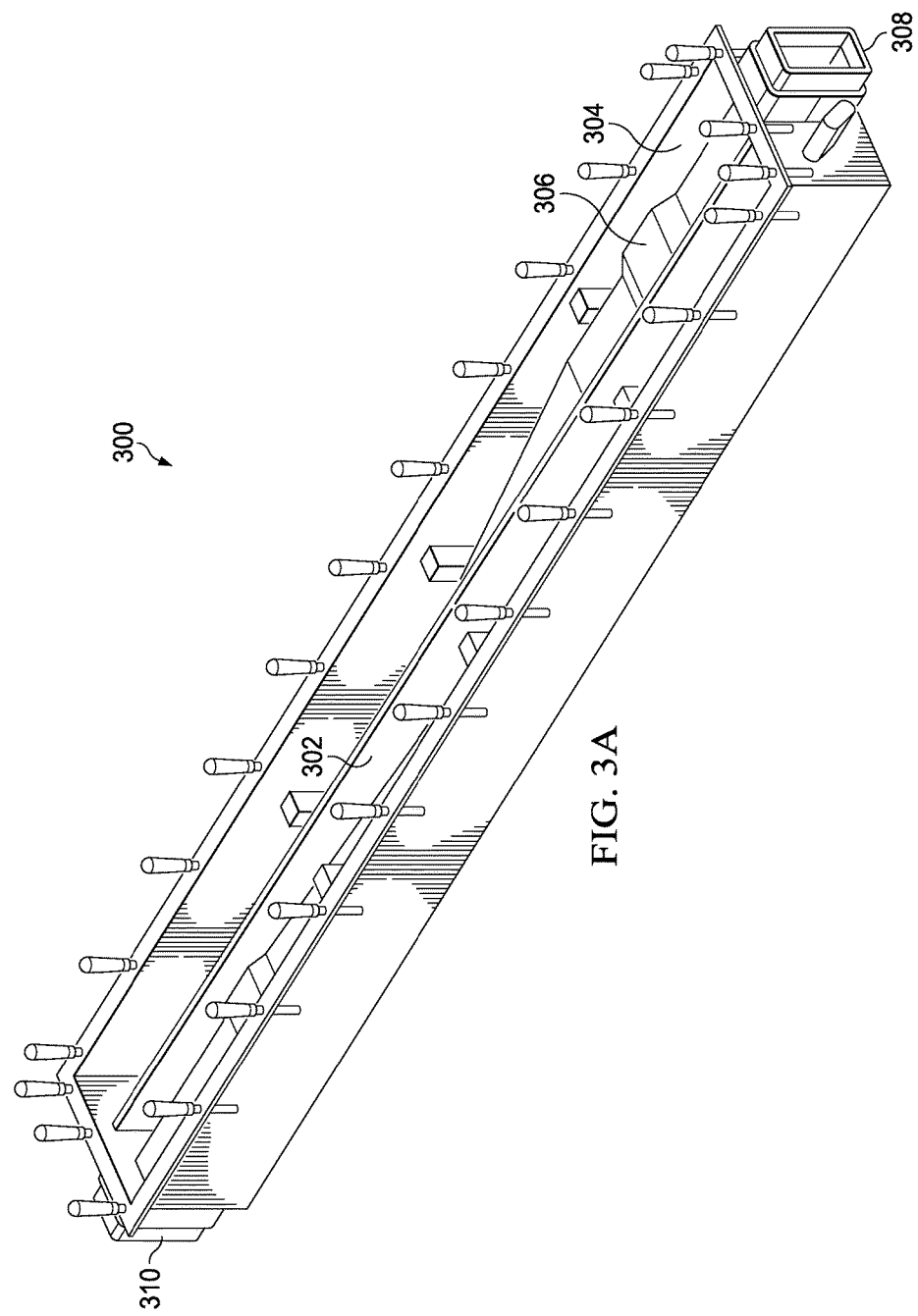
FIG. 3A is a perspective view of an example outer housing for a tool assembly.
Figure 3B:
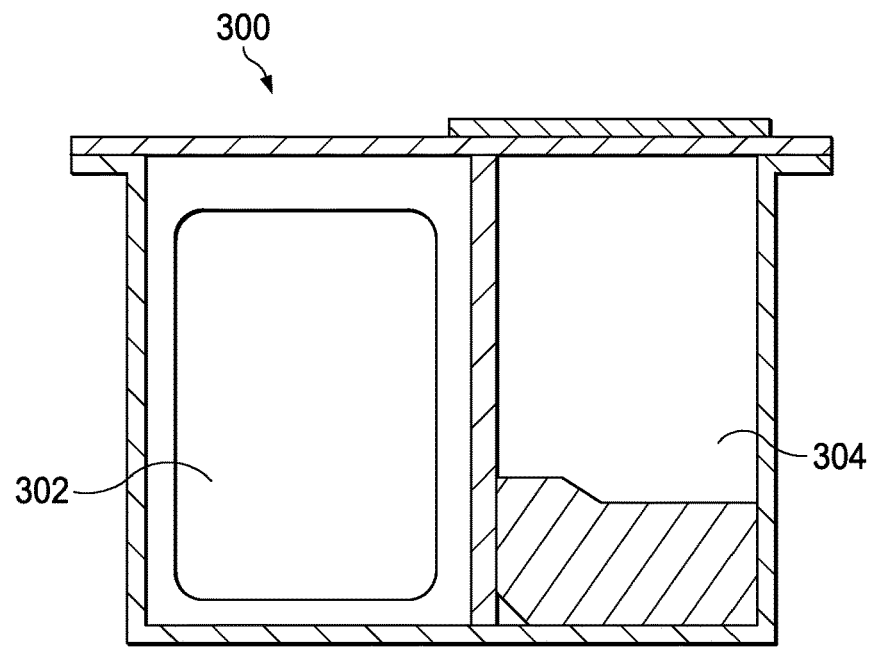
FIG. 3B is an end cross-sectional view of the example tool assembly.
Figure 3C:
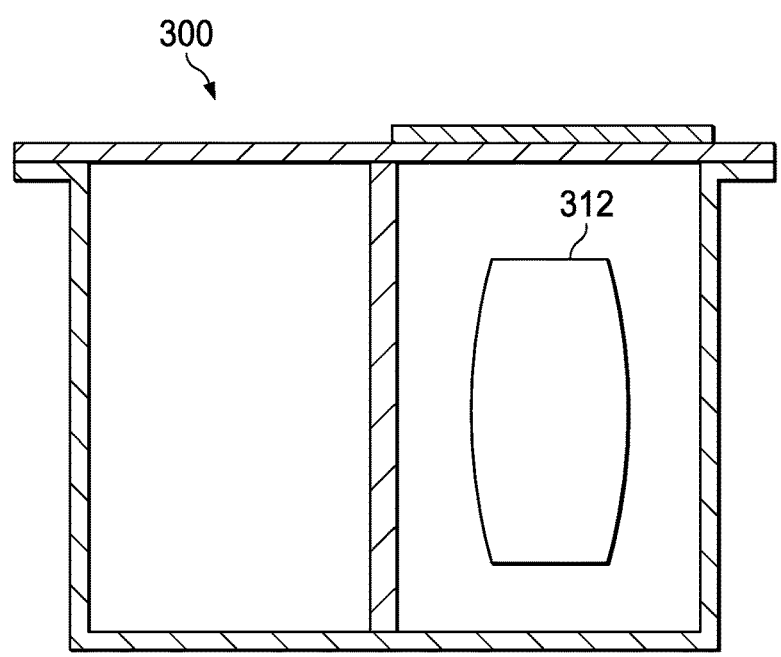
FIG. 3C is an end cross-sectional view of the example tool assembly.

In some implementations, the tool assembly can include an outer housing within which multiple elongated hollow members are positioned adjacent each other to allow multiple flexible bladders to be expanded by a single application of vacuum. FIG. 3A is a perspective view of a tool assembly 300. FIG. 3B is a cross-sectional view of one end of the example tool assembly 300. FIG. 3C is cross-sectional view of the other end of the example tool assembly system. The tool assembly 300 shown in FIGS. 3A and 3B can be formed by stacking multiple tool assemblies (e.g., tool assembly 302, tool assembly 304) similar to tool assembly 100 described above adjacent to each other. In some implementations, the inlet members of the tool assemblies in the stack can be on the same end. In some implementations, the inlet members of adjacent tool assemblies can be on opposing ends (e.g., inlet member 308 of tool assembly 304, inlet member 310 or tool assembly 302) such that the inlet members are on alternate ends in the stack. For example, having the inlet members on opposing ends can allow inserting two different tools into flexible bladders. FIG. 3A shows an elongated hollow member 306 in one tool assembly positioned adjacent to another elongated hollow member (hidden from view). An operator can expand both flexible bladders simultaneously (or in sequence) using a vacuum pump as described above. Alternatively, the operator can expand a bladder in one of the elongated hollow members.

Figure 4:
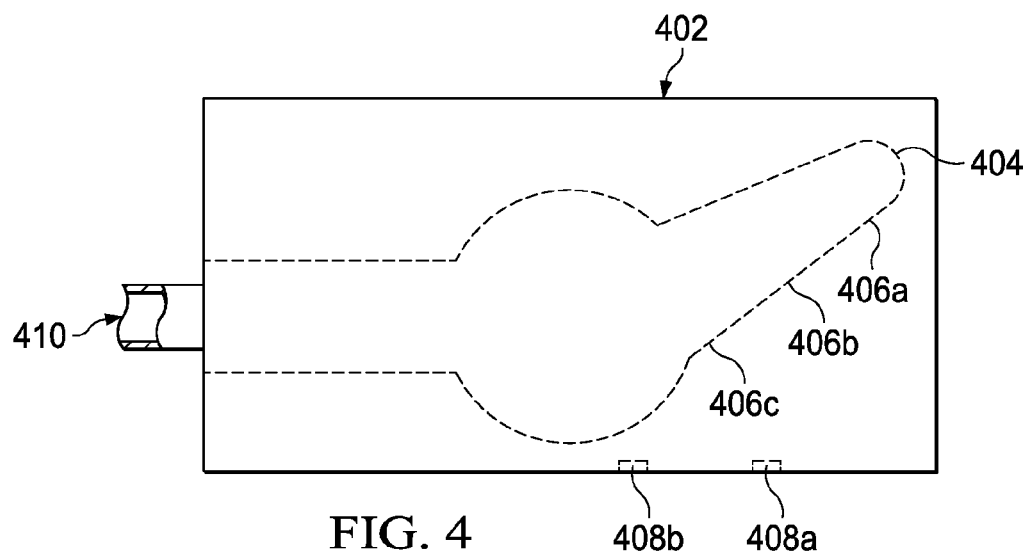
FIG. 4 is a schematic diagram of the example tool assembly including an outer housing.

In some implementations, the tool assembly 100 or each tool assembly in the stack of tool assemblies described above with reference to FIGS. 3A-3C can be positioned within a respective outer housing 402. FIG. 4 is a schematic diagram of such an outer housing 402 within which the elongated hollow member 404 (similar to the elongated hollow member 102) is placed. The elongated hollow member 404 includes multiple perforations (e.g., a first perforation 406a, a second perforation 406b, a third perforation 406c, and other perforations). Rather than forming vacuum ports on an outer surface of the elongated hollow member 404, the multiple ports multiple ports (e.g., a first port 408a, a second port 408b) through which vacuum is applied are formed on the outer housing 402. In operation, an operator can place the flexible bladder inside the elongated tool member 404 as described above.

As an alternative to applying vacuum to an outer surface of the elongated hollow member 404, vacuum can be applied through the ports 408a and 408b to an outer surface of the outer housing 402. The perforations in the elongated hollow member 404 permit evacuation of the space within the elongated hollow member 404, thereby allowing the flexible bladder (not shown) to expand to the inner surface of the elongated hollow member 404. The operator can then insert the tool (not shown) into the expanded flexible bladder. In some implementations, either one of the two ports 408a or 408b or a different port (not shown) can be connected to a pressure gauge to measure the vacuum in the outer housing 402. Also, a different port (not shown) can be formed in the outer housing 402 to relieve vacuum in the outer housing 402.

Figure 5:
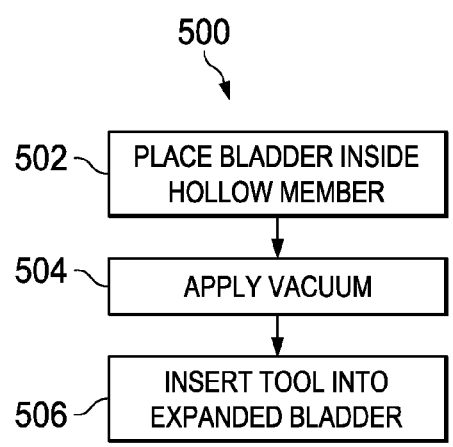
FIG. 5 is a flowchart of an example process for positioning a tool inside a flexible bladder.

FIG. 5 is a flowchart of an example process 500 for positioning a tool inside a flexible bladder. At 502, a flexible bladder is placed within a hollow portion of an elongated hollow member that includes at least one port. For example, the bladder can be made using rubber, silicon, composite or other material with elongation properties. In general, the bladder can be made using any material that is sufficiently flexible to expand within the tool assembly in response to vacuum. At 504, vacuum is applied to the port. The vacuum expands the flexible bladder within the hollow portion and expands the bladder, e.g., uniformly, into a pre-designed shape along the outer walls of the tool assembly. At 506, a tool is inserted into the expanded flexible bladder. The expanded bladder allows placing the tool, e.g., a mandrel or other tool, inside the bladder without risk to the bladder.

The subject matter described here can be implemented to manufacture composite rotorcraft components, e.g., blade spars or other composite rotorcraft components. For example, blade spar composite material can be placed on the flexible bladder with the inserted tool. The blade spar composite material can then be cured. During curing, the flexible bladder expands to push the composite material into the final configuration of the designed component, here, the blade spar. The subject matter can also be implemented to manufacture components, e.g., composite components or other components, of other systems, e.g., mechanical, electrical, or other systems. Examples of these systems would include but not limited to; ducting, torque tubes, and structural panels, among others. In general, the subject matter described here can be implemented to position a generally elongated component within a flexible bladder without needing to expand the flexible bladder over the component.

Thus, particular implementations of the subject matter have been described. Other implementations are within the scope of the following claims.

The invention claimed is:

1. A tool assembly comprising:
an elongated hollow member including a hollow portion to receive a flexible bladder within the hollow portion of the elongated hollow member;
a tool that is inserted into the flexible bladder when the flexible bladder is expanded;
an inlet member attached to an end of the elongated hollow member, the inlet member to receive the flexible bladder, wherein the inlet member comprises a lip to wrap the flexible bladder around; and
a port on the elongated hollow member to apply vacuum inside the elongated hollow member.

2. The tool assembly of claim 1, wherein the elongated hollow member comprises an inner surface that is substantially identical to the tool having an outer surface, wherein the tool is capable of being inserted in the flexible bladder.

3. The tool assembly of claim 2, wherein the tool includes a contoured outer surface, wherein the elongated hollow member comprises a contoured inner surface at a location that substantially corresponds to a location of the contoured outer surface of a tool capable of being inserted in the flexible bladder.

4. The tool assembly of claim 1, wherein the port is a first port, and wherein the tool assembly further comprises a second port on the elongated hollow member, the second port to connect to a pressure gauge or to relieve vacuum in the elongated hollow member.

5. The tool assembly of claim 1, wherein the tool assembly further comprises a plurality of ports to apply vacuum inside the elongated hollow member.

6. The tool assembly of claim 5, wherein the elongated hollow member includes a plurality of outer surfaces, wherein a first port of the plurality of ports is on a first outer surface and a second port of the plurality of ports is on a second outer surface that is different from the first outer surface, wherein the first outer surface is opposite the second outer surface.

7. The tool assembly of claim 1, further comprising an outer housing comprising a plurality of chambers including a first chamber to receive the elongated hollow member.

8. The tool assembly of claim 7, wherein each chamber includes a respective inlet member and a respective port.

9. The tool assembly of claim 7, wherein the first chamber comprises a port to apply vacuum inside the first chamber, and wherein the elongated hollow member comprises a plurality of perforations to transfer the vacuum to the elongated hollow member.

10. A method comprising:
positioning a flexible bladder within a hollow portion of an elongated hollow member comprising a port;
applying vacuum to the port, the vacuum expanding the flexible bladder within the hollow portion; and
inserting a tool into the expanded flexible bladder.

11. The method of claim 10, wherein the elongated hollow member comprises an upper portion and a lower portion that together define the hollow portion, and wherein positioning the flexible bladder within the hollow portion comprises:
laying the flexible bladder within the lower portion; and
positioning the upper portion over the lower portion.

12. The method of claim 10, wherein the elongated hollow member comprises an inlet member at an end of the elongated hollow member, and wherein positioning the flexible bladder within the hollow portion comprises inserting the flexible bladder into the hollow portion through the inlet member.

13. The method of claim 12, wherein the inlet member comprises a lip, and wherein the method further comprises wrapping the flexible bladder around the lip.

14. The method of claim 12, wherein the elongated hollow member comprises an inner surface that is substantially identical to an outer surface of the tool.

15. The method of claim 12, wherein the tool includes a contoured outer surface, wherein the elongated hollow member comprises a contoured inner surface at a location that substantially corresponds to a location of the contoured outer surface of the tool.

16. The method of claim 12, wherein the port is a first port, wherein the elongated hollow member further comprises a second port, and wherein the method further comprises measuring pressure in the elongated hollow member through the second port.

17. The method of claim 12, further comprising applying vacuum inside the elongated hollow member through a plurality of ports on the elongated hollow member.

18. A tool assembly comprising:
an elongated hollow member including a hollow portion to receive a flexible bladder in a hollow portion of the elongated hollow member;
a port on the elongated hollow member, the port to apply vacuum inside the elongated hollow member to expand the flexible bladders;
a tool that is inserted into the flexible bladder when the flexible bladder is expanded; and
an outer housing comprising a plurality of chambers including a first chamber to receive the elongated hollow member, wherein each chamber includes a respective port to apply vacuum inside the first chamber, wherein the elongated hollow member comprises a plurality of perforations to transfer the vacuum to the elongated hollow member.

\* \* \* \* \*